(12) United States Patent
Sheng et al.

(10) Patent No.: US 10,530,955 B2
(45) Date of Patent: Jan. 7, 2020

(54) LIGHT SENSING APPARATUS HAVING INCLINED BACKGROUND SHEET AND LIGHT SENSING METHOD USING THE SAME

(71) Applicant: AVISION INC., Hsinchu (TW)

(72) Inventors: Shao-Lan Sheng, Hsinchu (TW); Chi-Yao Chen, Nanjhuang Township, Miaoli County (TW)

(73) Assignee: AVISION INC., Hsinchu (TW)

( * ) Notice: Subject to any disclaimer, the term of this patent is extended or adjusted under 35 U.S.C. 154(b) by 0 days.

(21) Appl. No.: 15/976,112

(22) Filed: May 10, 2018

(65) Prior Publication Data

US 2018/0359385 A1 Dec. 13, 2018

(30) Foreign Application Priority Data

Jun. 9, 2017 (TW) .............................. 106119183 A
Nov. 1, 2017 (TW) .............................. 106137708 A

(51) Int. Cl.
| | |
|---|---|
| *G06F 15/00* | (2006.01) |
| *G06K 1/00* | (2006.01) |
| *H04N 1/028* | (2006.01) |
| *H04N 1/00* | (2006.01) |
| *H04N 1/12* | (2006.01) |

(52) U.S. Cl.
CPC ..... *H04N 1/02825* (2013.01); *H04N 1/00753* (2013.01); *H04N 1/00755* (2013.01); *H04N 1/1225* (2013.01)

(58) Field of Classification Search
CPC ........... H04N 1/02825; H04N 1/00755; H04N 1/1225
See application file for complete search history.

(56) References Cited

U.S. PATENT DOCUMENTS

| | | | |
|---|---|---|---|
| 7,441,704 B2 | 10/2008 | Ross | |
| 8,867,107 B1 | 10/2014 | Shimizu | |
| 2004/0246540 A1 | 12/2004 | Makino | |
| 2006/0001917 A1* | 1/2006 | Chen | H04N 1/0071 358/474 |

(Continued)

FOREIGN PATENT DOCUMENTS

| | | |
|---|---|---|
| CN | 1605188 A | 4/2005 |
| CN | 101494706 A | 7/2009 |

(Continued)

*Primary Examiner* — Moustapha Diaby
(74) *Attorney, Agent, or Firm* — Muncy, Geissler, Olds & Lowe, P.C.

(57) ABSTRACT

A light sensing apparatus includes a sheet passage, a first sensing assembly and a first background sheet. The sheet passage has a scan window. The first sensing assembly disposed on a first side of the scan window outputs first scan light to the scan window. The first background sheet disposed on a second side of the scan window has a first reflective surface reflecting the first scan light, passing through the scan window, back to the first sensing assembly through the scan window. The first reflective surface of the first background sheet and the scan window are disposed in a non-parallel manner. Therefore, a light sensing method is also provided to achieve the effects of brightness calibration and boundary detection of the first sensing assembly.

20 Claims, 6 Drawing Sheets

(56) References Cited

U.S. PATENT DOCUMENTS

| | | | |
|---|---|---|---|
| 2009/0185237 A1* | 7/2009 | Tanaka | H04N 1/125 358/461 |
| 2011/0141533 A1* | 6/2011 | Sheng | H04N 1/00588 358/474 |
| 2011/0176186 A1* | 7/2011 | Kanaya | H04N 1/00718 358/498 |
| 2013/0070349 A1 | 3/2013 | Takahashi | |
| 2015/0316706 A1 | 11/2015 | Fujiuchi et al. | |
| 2015/0341522 A1 | 11/2015 | Sheng et al. | |
| 2016/0370532 A1 | 12/2016 | Fujiuchi et al. | |
| 2018/0198952 A1* | 7/2018 | Ito | H04N 1/401 |

FOREIGN PATENT DOCUMENTS

| | | |
|---|---|---|
| CN | 102547049 A | 7/2012 |
| CN | 104243738 A | 12/2014 |
| CN | 105100540 A | 11/2015 |
| JP | 2013065933 A | 4/2013 |
| TW | 200845720 A | 11/2008 |
| TW | 201439595 A | 10/2014 |
| TW | 201545534 A | 12/2015 |

* cited by examiner

LIGHT SENSING APPARATUS HAVING INCLINED BACKGROUND SHEET AND LIGHT SENSING METHOD USING THE SAME

CROSS-REFERENCE TO RELATED APPLICATIONS

This application claims priorities of Nos. 106119183 and 106137708 respectively filed in Taiwan R.O.C. on Jun. 9, 2017 and Nov. 1, 2017 under 35 USC 119, the entire contents of which are hereby incorporated by reference.

BACKGROUND OF THE INVENTION

Field of the Invention

This disclosure relates to a light sensing apparatus and a light sensing method using the same, and more particularly to a light sensing apparatus having an inclined background sheet and a light sensing method using the same.

Description of the Related Art

Generally, in a conventional light sensing apparatus of a sheet-fed scanner, a white background sheet needs to be provided so that a light sensing module (or sensing assembly) can perform the standard white calibration. In addition, most documents have the white background, so the brightness difference between the white background, sensed by the light sensing module, and the background sheet is usually so great, and the light sensing apparatus cannot find the edges of the scanned document. This is not advantageous to the brightness calibration and the automatic cropping in the sensing assembly, so a black background sheet is used to assist in finding the edges. On the contrary, the black background sheet cannot be used by the sensing assembly to perform the brightness calibration operation. So, the white background sheet is required to complete the brightness calibration of the sensing assembly. Therefore, in order to perform the brightness calibration and the automatic cropping of the sensing assembly, two background sheets are needed, and the mechanism design also becomes more complicated.

In order to provide the black background sheet and the white background sheet concurrently in the prior art, such as U.S. Pat. No. 7,441,704, the black background sheet and the white background sheet are disposed on the same shaft. When the calibration is enabled, the white background sheet faces the window so that the sensing assembly performs the brightness calibration. When the sheet is scanned, the black background sheet faces the window by way of coaxial rotation, so that the sensing assembly can clearly identify the boundary between the black background sheet and the original and automatic cropping can be performed. In another conventional technical solution, one gray background sheet is used to achieve the brightness calibration for the sensing assembly of the white background sheet, and the automatic cropping for the black background sheet. However, the color of the gray background sheet is toned upon manufacturing, so the uniform color cannot be easily obtained upon manufacturing. Thus, the brightness calibration error of the sensing assembly is resulted.

Thus, how to provide a light sensing apparatus having a sensing assembly with the uniform and stable background color for the brightness calibration and automatic cropping is an issue to be solved by this disclosure.

BRIEF SUMMARY OF THE INVENTION

An objective of this disclosure is to provide a light sensing apparatus having an inclined background sheet and a light sensing method using the same to provide a sensing assembly with the uniform and stable background color for the brightness calibration and the automatic cropping.

To achieve the above-identified object, this disclosure provides a light sensing apparatus, which includes a sheet passage, a first sensing assembly and a first background sheet. The sheet passage has a scan window. The first sensing assembly is disposed on a first side of the scan window and outputs first scan light to the scan window. The first background sheet is disposed on a second side of the scan window and has a first reflective surface, wherein the first reflective surface reflects the first scan light, passing through the scan window, back to the first sensing assembly through the scan window. The first reflective surface of the first background sheet and the scan window are disposed in a non-parallel manner.

The above-mentioned light sensing apparatus may further include a second sensing assembly and a second background sheet. The second sensing assembly is disposed on the second side of the scan window, and outputs second scan light to the scan window. The second background sheet is disposed on the first side of the scan window and has a second reflective surface, wherein the second reflective surface reflects the second scan light, passing through the scan window, back to the second sensing assembly through the scan window. The second reflective surface of the second background sheet and the scan window are disposed in a non-parallel manner.

In the above-mentioned light sensing apparatus, when a data medium is transported by a transporting mechanism of the light sensing apparatus past the scan window along the sheet passage, a first portion of the first scan light is reflected, by a first surface of the data medium, back to the first sensing assembly to generate a first scan signal, and a second portion of the first scan light is reflected, by the first background sheet, back to the first sensing assembly to generate a first background signal.

This disclosure also provides a light sensing method applied to the above-mentioned light sensing apparatus. The light sensing method includes the following steps: transporting the data medium into the sheet passage; generating a mixed signal of the first scan signal and the first background signal according to the following steps: sensing the second portion of the first scan light by the first sensing assembly before the data medium passes through the scan window; sensing the first portion and the second portion of the first scan light by the first sensing assembly when the data medium passes through the scan window; and sensing the first portion of the first scan light by the first sensing assembly after the data medium passes through the scan window; and separating the first scan signal from the mixed signal according to a property of the first background signal.

With the above-mentioned light sensing apparatus and method, the inclined background sheet may be used to provide the uniform grayscale background different from the white background of the data medium and to achieve the brightness calibration function of the sensing assembly and the automatic cropping function. Furthermore, the background sheet may be driven by the driving mechanism to rotate to the horizontal state to provide the effect of the brightness calibration. In addition, the background sheet may be driven by the driving mechanism to rotate to other tilt angles and to achieve the effect of providing the backgrounds with different grayscales. The above-mentioned characteristics can be accomplished using one single background sheet, the structure is simple, the effect is significant, and an effective background detection effect is provided for sheet-fed scanners.

Further scope of the applicability of this disclosure will become apparent from the detailed description given hereinafter. However, it should be understood that the detailed description and specific examples, while indicating preferred embodiments of this disclosure, are given by way of illustration only, since various changes and modifications within the spirit and scope of this disclosure will become apparent to those skilled in the art from this detailed description.

DETAILED DESCRIPTION OF THE INVENTION

A linear image sensor is constituted by several sensor cells, which are arranged in a straight line with a uniform gap interposed therebetween, and generate different voltages in response to different intensities of reflected light. A charge-coupled device (CCD) type image sensor and a contact image sensor (CIS) are available in the market. More particularly, a lot of contact image sensors are used in scanners due to the low prices thereof. The embodiment of this disclosure may be applied to the above-mentioned two sensors working in conjunction with an inclined background sheet to provide a gray background different from a white background of a data medium. This is advantageous to the subsequent brightness calibration of the sensing assembly and the automatic cropping function.

Figure 1:
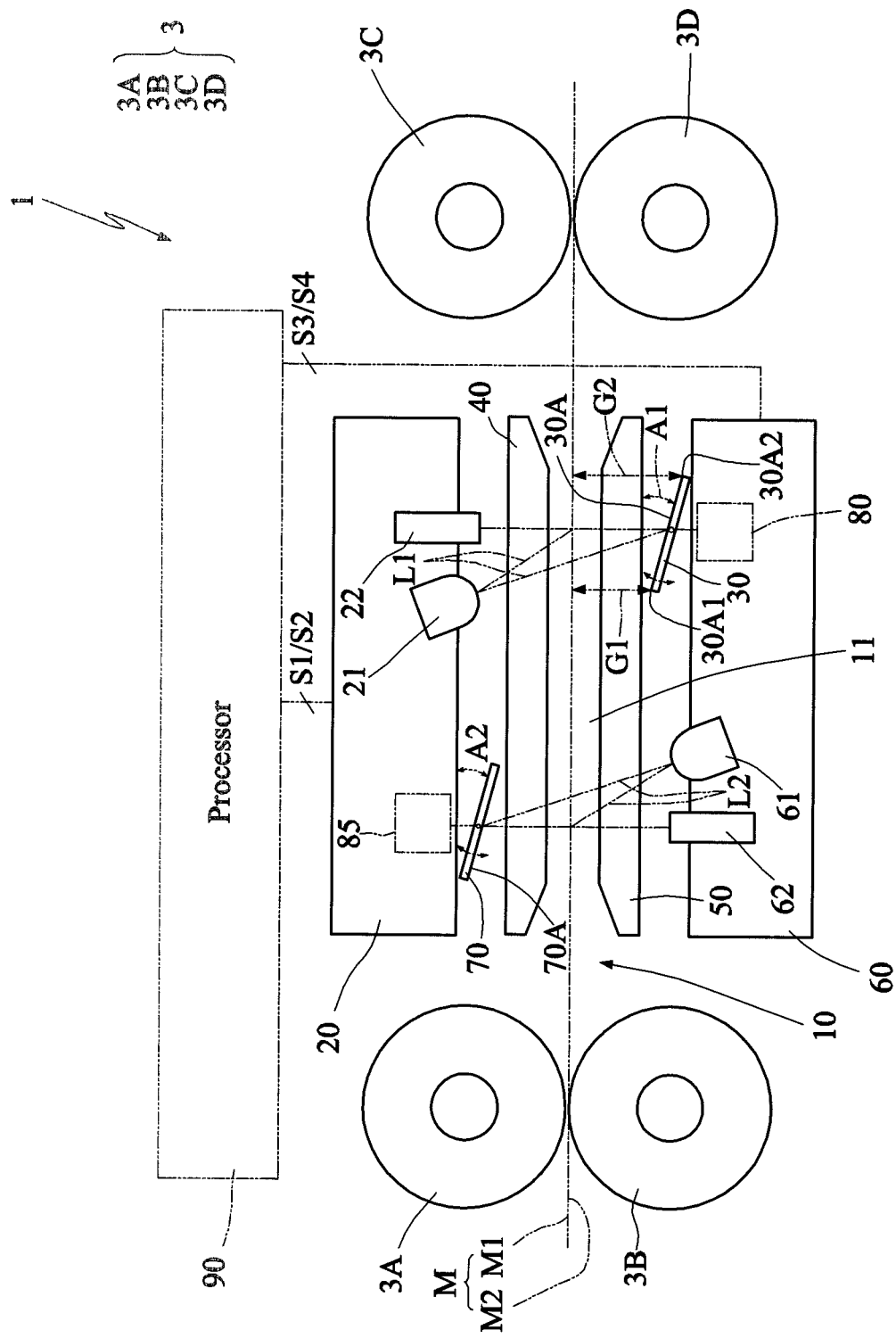
FIGS. 1 and 2 are schematic views showing two states of a light sensing apparatus according to a preferred embodiment of this disclosure.
Figure 2:
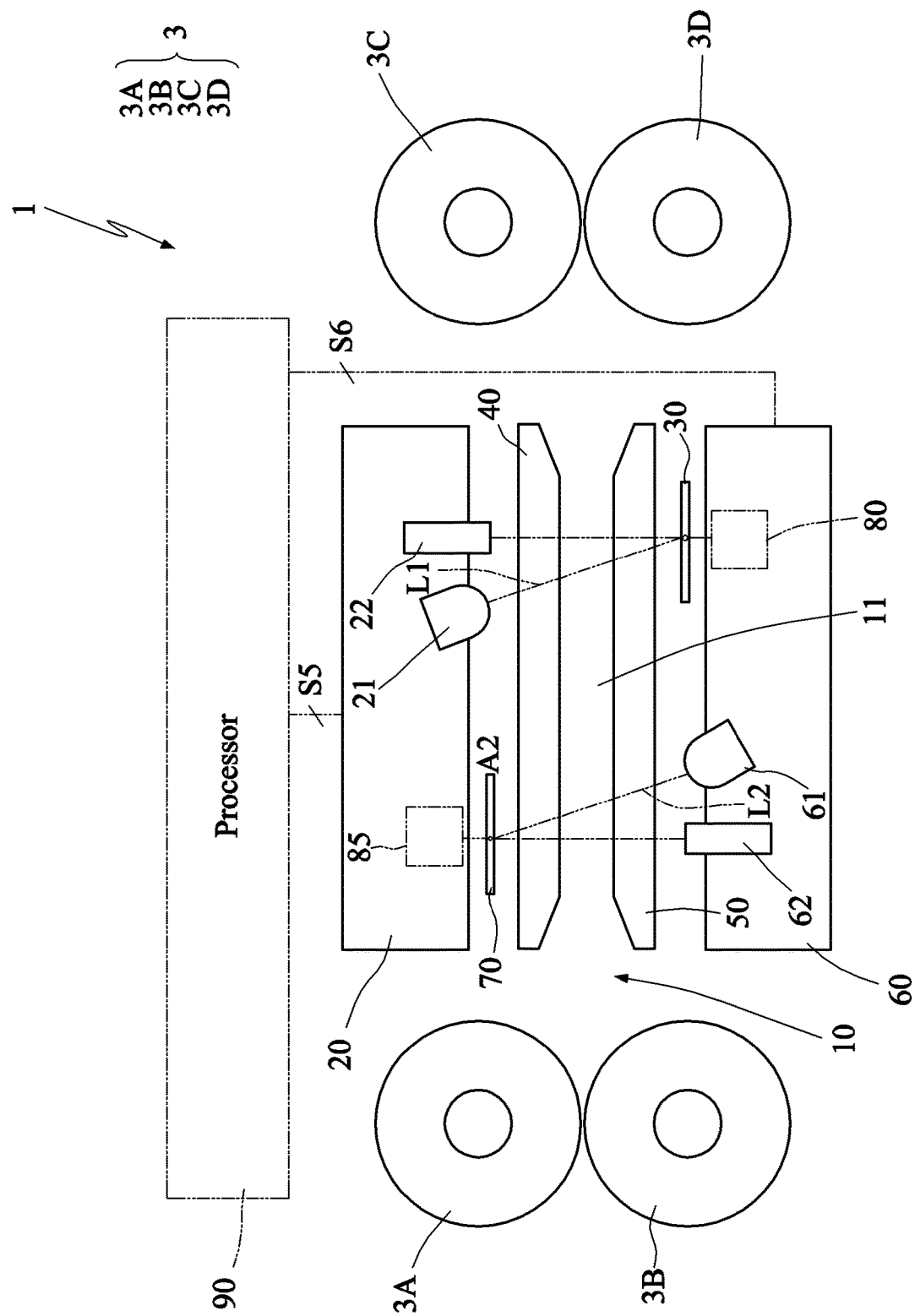

FIGS. 1 and 2 are schematic views showing two states of a light sensing apparatus according to a preferred embodiment of this disclosure. As shown in FIGS. 1 and 2, a light sensing apparatus 1 of this embodiment is, for example, a sheet-fed scanner, which captures an image of a data medium while feeding the data medium. Although the figures are implemented with a double-sided scanner, it does not intend to limit this disclosure because the simplex scanner may also achieve the effect of this disclosure. The light sensing apparatus 1 includes a sheet passage 10, a first sensing assembly 20 and a first background sheet 30. In this way, the effect of the simplex scan can be implemented. In order to perform the duplex scan, the light sensing apparatus 1 may further include a second sensing assembly 60 and a second background sheet 70.

The sheet passage 10 has a scan window 11. The first sensing assembly 20 is disposed on a first side of the scan window 11, and outputs first scan light L1 to the scan window 11. The second sensing assembly 60 is disposed on a second side of the scan window 11, and outputs second scan light L2 to the scan window 11.

The first background sheet 30 is disposed on the second side of the scan window 11, and has a first reflective surface 30A, which reflects the first scan light L1, passing through the scan window 11, back to the first sensing assembly 20 through the scan window 11. The second background sheet 70 is disposed on the first side of the scan window 11, and has a second reflective surface 70A, which reflects the second scan light L2, passing through the scan window 11, back to the second sensing assembly 60 through the scan window 11. The first side and the second side are opposite sides. In FIG. 1, the upper side and the lower side are illustrated. That is, a connection line of the first background sheet 30 and the first sensing assembly 20 intersects with the scan window 11.

In this embodiment, the first reflective surface 30A of the first background sheet 30 and the scan window 11 are disposed in a non-parallel manner, so that the first background sheet 30 provides a non-standard white background to achieve the effect of boundary detection. In addition, the second reflective surface 70A of the second background sheet 70 and the scan window 11 are disposed in a non-parallel manner, so that the second background sheet 70 provides a grayscale background to achieve the effect of boundary detection. The first reflective surface 30A is a surface that reflects the first scan light L1, and the second reflective surface 70A is a surface that reflects the second scan light L2. In this embodiment, a gap between the sheet passage 10 and the first reflective surface 30A of the first background sheet 30 increases from a light emitting element side of the first sensing assembly 20 to a sensing element side of the first sensing assembly 20 in an extending direction of the sheet passage 10. In other words, the gap G1 is smaller than the gap G2 when the first sensing assembly 20 receives reflected light from the first reflective surface 30A of the first background sheet 30. As shown in FIG. 1, the first reflective surface 30A has a first edge 30A1 and a second edge 30A2, which is disposed opposite the first edge 30A1 and further from the sheet passage 10 than the first edge 30A1. The first edge 30A1 and the first light emitting element 21 are disposed on one side of an optical path of the first scan light L1 from the first reflective surface 30A to the first sensing elements 22 while the second edge 30A2 is disposed on the other side of the optical path of the first scan light L1.

The above-mentioned light sensing apparatus 1 may further include a first transparent substrate 40 and a second transparent substrate 50, which are respectively disposed on two sides of the scan window 11, and located between the first sensing assembly 20 and the first background sheet 30, or located between the second sensing assembly 60 and the second background sheet 70. In this embodiment, the first transparent substrate 40 and the second transparent substrate 50 are disposed in parallel, and define the range of the scan window 11. Materials of the first transparent substrate 40 and the second transparent substrate 50 are selected from a group consisting of glass, polycarbonate (PC), polypropylene (PP), acrylonitrile-butadiene-styrene (ABS) copolymer and polymethylmethacrylate (PMMA). In this embodiment, the first background sheet 30 and the second background sheet 70 are long sheets so that the space between the transparent substrate and the sensing assembly are reduced.

In another embodiment, the first background sheet 30 and the second background sheet 70 may be in the triangular forms so that they can be easily mounted on the transparent substrate or the sensing assembly. It is worth noting that the scan window 11 is not necessarily defined by the first transparent substrate 40 and the second transparent substrate 50, may also be defined by the single transparent substrate, and may also be defined by the guide sheet having an opening. In addition, the first transparent substrate 40 and the first reflective surface 30A of the first background sheet 30 are disposed in a non-parallel manner, and the second transparent substrate 50 and the second reflective surface 70A of the second background sheet 70 are disposed in a non-parallel manner.

In this embodiment, a first angle A1 is formed between the first background sheet 30 and the scan window 11, a second angle A2 is formed between the second background sheet 70 and the scan window 11, and the first angle A1 and the second angle A2 are equal to each other. In one example, the first angle A1 ranges between 3° and 30°, and the light intensities sensed by multiple first sensing elements 22 at the tilt angle of this section have a larger simulated gray range. In another example, the first angle A1 ranges between 10° and 20°, preferably between 12° and 15°, and the light intensities sensed by the first sensing elements 22 at the tilt angle of this section have a definite simulated gray range. In other words, when the first angle A1 and the second angle A2 are 0° and the first background sheet 30 and the second background sheet 70 are white, the first sensing element 22 and the second sensing element 62 sense most of the reflected light, which is the brightest. As the angle between the first angle A1 and the second angle A2 gradually increases, more light is reflected from the first background sheet 30 or/and the second background sheet 70, and the brightness sensed by the first sensing element 22 and the second sensing element 62 is darker, that is, the sensed result changes from the brightest white background to the gray background. As the angle between the first angle A1 and the second angle A2 gets larger, the light intensities sensed by the first sensing element 22 and the second sensing element 62 get weaker and darker. In this way, the brightness correction for the photosensitive assembly is performed according to the light reflected by the inclined first background sheet 30 and second background sheet 70, and the inclined configuration reflects the partial light out or causes the diffuse-reflection of the partial light, so that the light absorbed by the first sensing element 22 and the second sensing element 62 becomes less. In this embodiment, when the background sheet is white, the sensed light has the gray property. That is, the color of the sensed light is used as the standard color upon calibration.

In another example, the first angle A1 is unequal to the second angle A2 so that different light intensities are provided to simulate different background colors for front and reverse sides having different backgrounds.

The first sensing assembly 20 includes a first light emitting element 21 and multiple first sensing elements 22. The second sensing assembly 60 includes a second light emitting element 61 and multiple second sensing elements 62. The first background sheet 30 is disposed opposite the first sensing elements 22, and the second background sheet 70 is disposed opposite the second sensing elements 62. The first light emitting element 21 emits the first scan light L1 to the scan window 11, and the second light emitting element 61 emits the second scan light L2 to the scan window 11. The first sensing elements 22 receive the first scan light L1 reflected by the first background sheet 30, and the second sensing elements 62 receive the second scan light L2 reflected by the second background sheet 70.

In addition to sensing of the grayscale values of the first background sheet 30 and the second background sheet 70, the first sensing assembly 20 and the second sensing assembly 60 may also be used to scan a data medium M. When the data medium M is transported by a transporting mechanism 3 of the light sensing apparatus 1 past the scan window 11 along the sheet passage 10, a first portion of the first scan light L1 is reflected, by a first surface M1 of the data medium M, back to the first sensing assembly 20 to generate a first scan signal S1; and a second portion of the first scan light L1 is reflected, by the first background sheet 30, back to the first sensing assembly 20 to generate a first background signal S2. The first portion and the second portion of the first scan light L1 extend in the direction perpendicular to the surface of the drawing, and constitute the illumination light of the width direction of the data medium M, wherein the width direction is substantially perpendicular to the travelling direction of the data medium M (if the plane of FIG. 1 is an XY plane, then the width direction is a Z axis direction). A first portion of the second scan light L2 is reflected, by a second surface M2 of the data medium M, back to the second sensing assembly 60 to generate a second scan signal S3. A second portion of the second scan light L2 is reflected, by the second background sheet 70, back to the second sensing assembly 60 to generate a second background signal S4. The first portion and the second portion of the second scan light L2 extend in the direction perpendicular to the surface of the drawing, and constitute the illumination light of the width direction of the data medium M. In this embodiment, the transporting mechanism 3 includes transporting rollers 3A, 3B, 3C and 3D. The scan window 11 ranges between the transporting rollers 3A, 3B and the transporting rollers 3C, 3D, and a first optical path from the data medium M to the first sensing element 22, and a second optical path from the first background sheet 30 to the first sensing element 22 are substantially perpendicular to the data medium M and the sheet passage 10.

In order to perform the standard white calibration, the light sensing apparatus 1 may further include a first driving mechanism 80 connected to the first background sheet 30; and a second driving mechanism 85 connected to the second background sheet 70. In a scan mode, the first driving mechanism 80 drives the first reflective surface 30A of the first background sheet 30 to rotate relatively to the first sensing assembly 20 to be not parallel to the scan window 11, and the second driving mechanism 85 drives the second reflective surface 70A of the second background sheet 70 to rotate relatively to the second sensing assembly 60 to be not parallel to the scan window 11 (i.e., the state shown in FIG. 1).

In a calibration mode, the first driving mechanism 80 drives the first background sheet 30 to rotate relatively to the first sensing assembly 20 to be substantially parallel to the scan window 11, and the first sensing assembly 20 receives the first scan light L1 to obtain a first calibration signal S5; and the second driving mechanism 85 drives the second background sheet 70 to rotate relatively to the second sensing assembly 60 to be substantially parallel to the scan window 11, and the second sensing assembly 60 receives the second scan light L2 to obtain a second calibration signal S6 in the state shown in FIG. 2. Consequently, a processor 90 of the light sensing apparatus 1 calibrates the first scan signal S1 according to first calibration signal S5, and calibrates the second scan signal S3 according to the second calibration signal S6.

In other modes, the first driving mechanism 80 may also drive the first background sheet 30 to rotate to different angular positions to provide different backgrounds with different grayscales. The same technique may also be applied to the second driving mechanism 85 and the second background sheet 70.

It is worth noting that FIG. 1 shows that both the first optical path and the second optical path may be present concurrently. This is because the first background sheet 30 is usually designed to be wider (the width direction is perpendicular to the sheet surface of FIG. 1), and the data medium M may be narrower than the first background sheet 30. So, the first optical path is located at the inner side of the data medium M, and the second optical path is located at the outer side of the data medium M.

Figure 3:
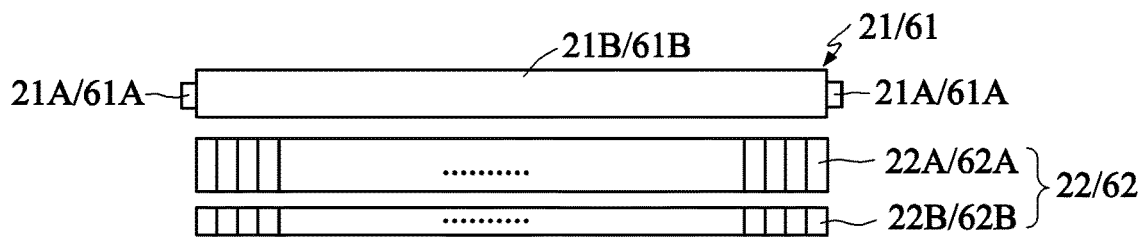
FIG. 3 is a schematic view showing a light emitting element and sensing elements.

FIG. 3 is a schematic view showing a light emitting element and sensing elements. Referring to FIG. 3, the first light emitting element 21 includes two light sources 21A, one of which may be removed in another example, and a light guide 21B, and the light guide 21B homogenizes the light of the light sources 21A and guides the light downwards. In addition, these first sensing elements 22 include a lens array 22A and a sensing member array 22B. Similarly, the second light emitting element 61 includes two light sources 61A, one of which may be removed in another example, and a light guide 61B, and the light guide 61B homogenizes the light of the light sources 61A and guides the light downwards. In addition, these first sensing elements 22 include a lens array 62A and a sensing member array 62B.

Figure 4A:
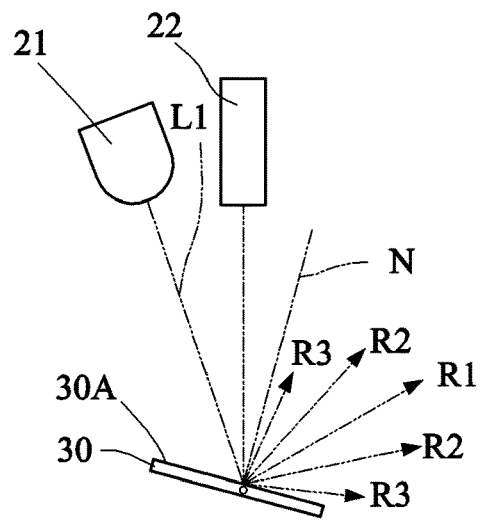
FIGS. 4A and 4B show one example of optical path diagrams corresponding to FIGS. 1 and 2, respectively.
Figure 4B:
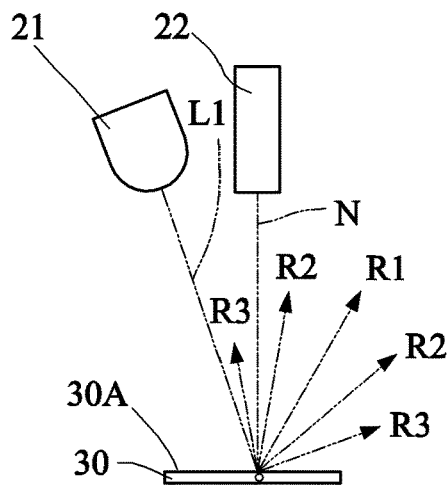

FIGS. 4A and 4B show one example of optical path diagrams corresponding to FIGS. 1 and 2, respectively. As shown in FIGS. 4A and 4B, if the first scan light L1 emitted from the first light emitting element 21 follows the law that the incident angle is equal to the reflection angle (the reference normal is denoted as N), then the intensity of the reflected light R1 is highest. However, because the first background sheet 30 itself is not a mirror, some diffuse-reflection phenomena are present, so that the intensities of the reflected light R2 and R3 descend. Therefore, the intensity of the reflected light received by the first sensing element 22 of FIG. 4A (lower than the intensity of the reflected light R3) is lower than the intensity of the reflected light received in FIG. 4B (higher than the intensity of the reflected light R3). Therefore, the inclined first background sheet 30 can provide a grayscale background to achieve the effect of boundary detection on the scanned image of the data medium.

Figure 5A:
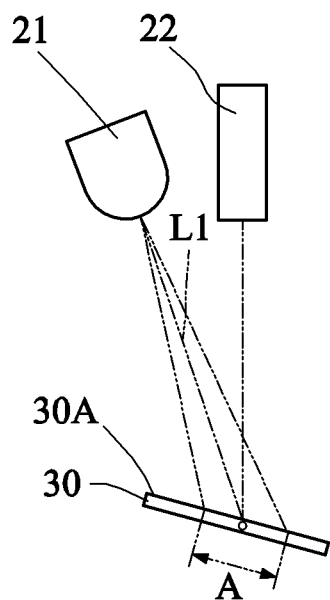
FIGS. 5A and 5B show another example of the optical path diagrams corresponding to FIGS. 1 and 2, respectively.
Figure 5B:
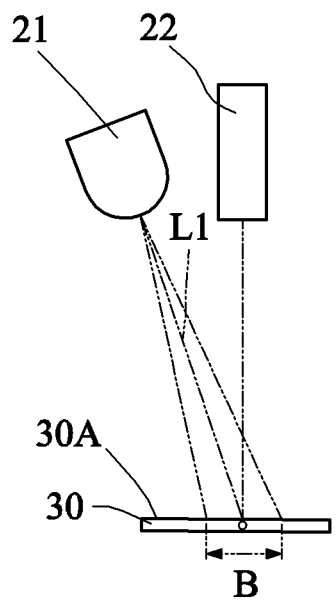

FIGS. 5A and 5B show another example of the optical path diagrams corresponding to FIGS. 1 and 2, respectively. In another perspective based on the length of the energy distribution of the first scan light L1 of the same divergence angle of the first light emitting element 21, the length of the energy distribution on the inclined first background sheet 30 is equal to a dimension A, and the length of the energy distribution on the horizontal first background sheet 30 is equal to a dimension B. The dimension A is greater than the dimension B, so the inclined first background sheet 30 causes the dispersion of the energy of the light source, and the energy of the light received by the first sensing element 22 decreases. That is, the sensed brightness decreases.

Figure 6:
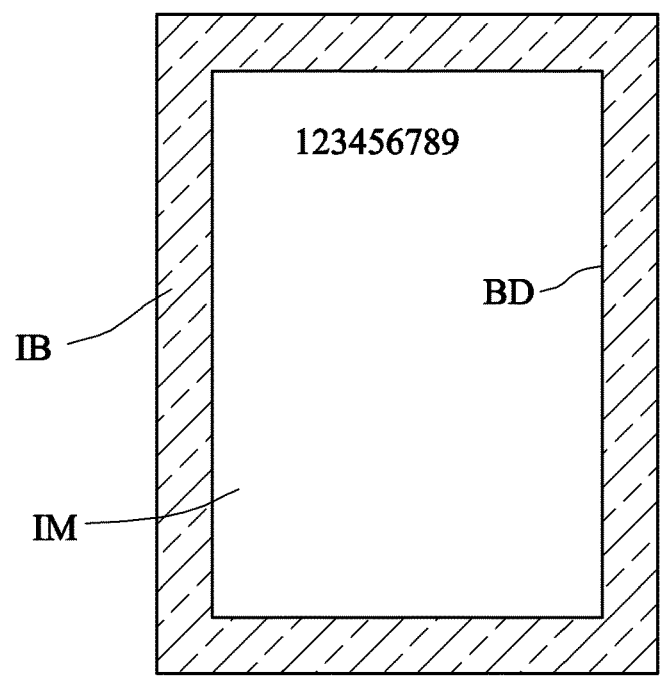
FIG. 6 is a schematic view showing automatic cropping.
Figure 7:
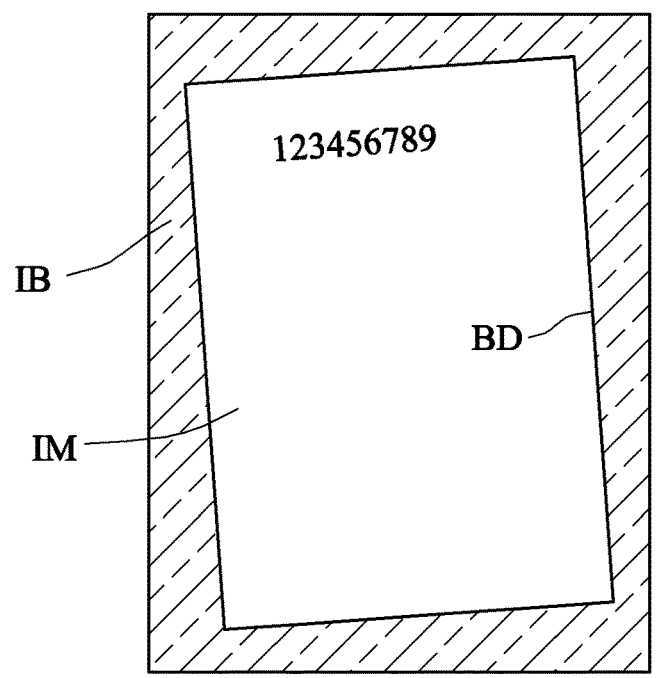
FIG. 7 is a schematic view showing skew correction.

FIG. 6 is a schematic view showing automatic cropping. FIG. 7 is a schematic view showing skew correction. As shown in FIGS. 6 and 7, the scanned image includes an image IM of the data medium M in the inner annular portion and an image IB of the background sheet in the outer annular portion (surrounding the image IM). Because the grayscale levels (darker, wherein the grayscale level is equal to, for example, 160) of the image IB is significantly smaller than the grayscale level of the background (brighter, wherein the grayscale level is equal to, for example, 220) of the image IM, the processor 90 may seek one or multiple boundaries BD of an image IM representative of the first scan signal S1 according to the first background signal S2, and the processor 90 seeks one or multiple boundaries BD of an image IM representative of the second scan signal S3 according to the second background signal S4. So, the processor 90 may perform automatic cropping and skew correction.

In another example, a fixed background sheet may also be employed. In this situation, the processor 90 may calibrate the first scan signal S1 according to the first background signal S2 and calibrate the second scan signal S3 according to the second background signal S4. That is, the grayscale level corresponding to the background signal is known, the calibration may be made according to this grayscale level.

Figure 8:
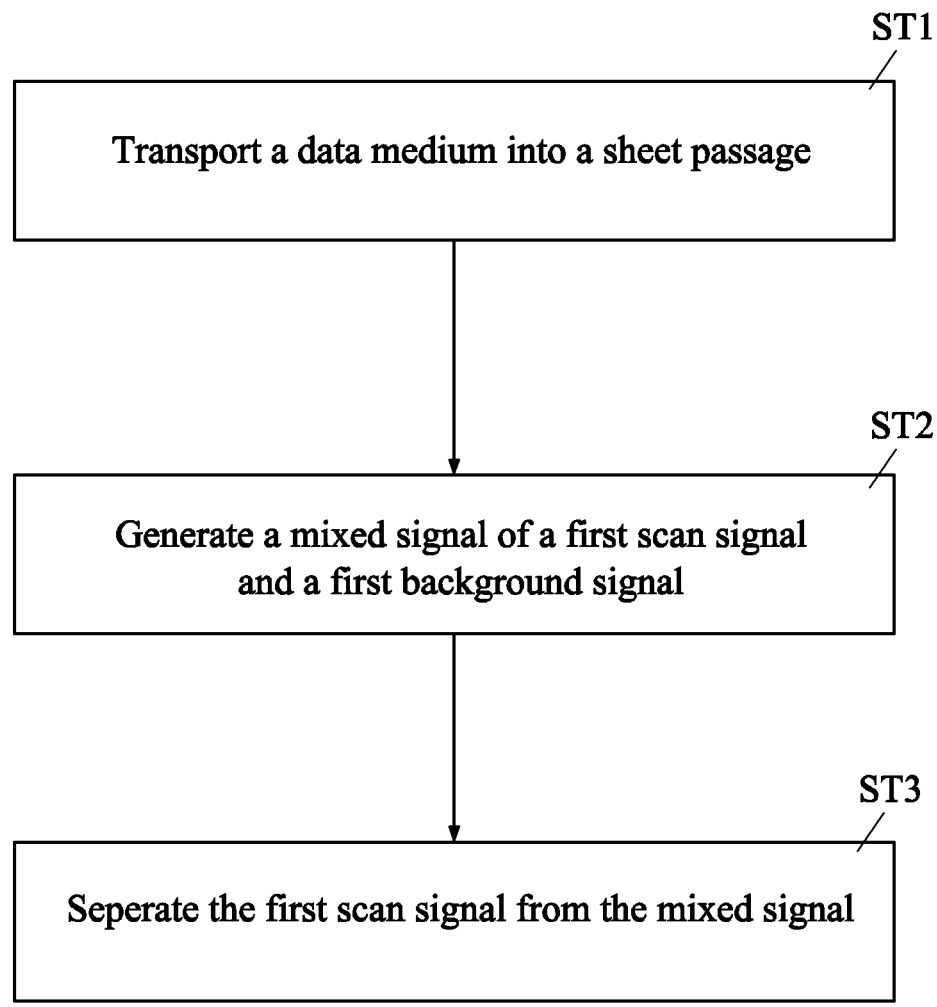
FIG. 8 is a flow chart showing a light sensing method according to the preferred embodiment of this disclosure.

FIG. 8 is a flow chart showing a light sensing method according to the preferred embodiment of this disclosure. As shown in FIG. 8, this embodiment also provides a light sensing method applied to the above-mentioned light sensing apparatus 1. The light sensing method includes the following steps. First, in step ST1, the data medium M is transported into the sheet passage 10. Then, in step ST2, a mixed signal of the first scan signal S1 and the first background signal S2 is generated according to the following steps of: (a) sensing the second portion of the first scan light L1 by the first sensing assembly 20 before the data medium M reaches the scan window 11; (b) sensing the first portion and the second portion of the first scan light L1 by the first sensing assembly 20 when the data medium M passes through the scan window 11; and (c) sensing the first portion of the first scan light L1 by the first sensing assembly 20 after the data medium M leaves the scan window 11. Finally, in step ST3, the first scan signal S1 is separated from the mixed signal according to the property of the first background signal S2. The property of the first background signal S2 corresponds to the tilt angle of the first background sheet 30 (i.e., the grayscale level of the first reflective surface 30A of the first background sheet 30 sensed by the above-mentioned first sensing element 22). The above-mentioned mixed signal corresponds to the signal of the overall image of FIG. 6 or 7, for example. So, the background detection can be achieved to perform the functions of automatic cropping and skew correction.

With the above-mentioned light sensing apparatus and light sensing method, the inclined background sheet may be used to provide the uniform grayscale background different from the white background of the data medium and to achieve the brightness calibration function of the sensing assembly and the automatic cropping function. Furthermore, the background sheet may be driven by the driving mechanism to rotate to the horizontal state to provide the effect of the brightness calibration. In addition, the background sheet may be driven by the driving mechanism to rotate to other tilt angles and to achieve the effect of providing the backgrounds with different grayscales. The above-mentioned characteristics can be accomplished using one single background sheet, the structure is simple, the effect is significant, and an effective background detection effect is provided for sheet-fed scanners.

While this disclosure has been described by way of examples and in terms of preferred embodiments, it is to be understood that this disclosure is not limited thereto. To the contrary, it is intended to cover various modifications.

Therefore, the scope of the appended claims should be accorded the broadest interpretation so as to encompass all such modifications.

What is claimed is:

1. A light sensing apparatus, comprising:
   a sheet passage having a scan window;
   a first sensing assembly, which is disposed on a first side of the scan window, and outputs first scan light to the scan window; and
   a first background sheet, which is disposed on a second side of the scan window and has a first reflective surface, wherein the first reflective surface reflects the first scan light, passing through the scan window, back to the first sensing assembly through the scan window;
   wherein the first reflective surface of the first background sheet and the scan window are disposed in a non-parallel manner, and a gap between the sheet passage and the first reflective surface of the first background sheet increases from a light emitting element side of the first sensing assembly to a sensing element side of the first sensing assembly in an extending direction of the sheet passage when the first sensing assembly receives reflected light from the first reflective surface of the first background sheet.

2. The light sensing apparatus according to claim 1, wherein the first sensing assembly comprises a first light emitting element and multiple first sensing elements, the first light emitting element emits the first scan light to the scan window, and the first sensing elements receive the first scan light reflected by the first background sheet, wherein the first reflective surface of the first background sheet has a first edge and a second edge, which is disposed opposite the first edge and further from the sheet passage than the first edge of the first reflective surface, wherein the first edge of the first reflective surface and the first light emitting element are disposed on one side of an optical path of the first scan light from the first reflective surface to the first sensing elements while the second edge of the first reflective surface is disposed on the other side of the optical path of the first scan light.

3. The light sensing apparatus according to claim 2, wherein the first background sheet and the first sensing elements are disposed opposite each other.

4. The light sensing apparatus according to claim 2, wherein a first angle is formed between the first background sheet and the scan window, and the first angle ranges between 3° and 30°.

5. The light sensing apparatus according to claim 4, wherein the first angle ranges between 12° and 15°.

6. The light sensing apparatus according to claim 1, further comprising a first transparent substrate disposed between the first sensing assembly and the first background sheet.

7. The light sensing apparatus according to claim 1, further comprising a first transparent substrate and a second transparent substrate respectively disposed on two sides of the scan window, and disposed between the first sensing assembly and the first background sheet.

8. The light sensing apparatus according to claim 1, wherein when a data medium is transported by a transporting mechanism of the light sensing apparatus past the scan window along the sheet passage, a first portion of the first scan light is reflected, by a first surface of the data medium, back to the first sensing assembly to generate a first scan signal, and a second portion of the first scan light is reflected, by the first background sheet, back to the first sensing assembly to generate a first background signal.

9. The light sensing apparatus according to claim 8, wherein a processor of the light sensing apparatus seeks one or multiple boundaries of an image representative of the first scan signal according to the first background signal, or calibrates the first scan signal according to the first background signal.

10. The light sensing apparatus according to claim 8, further comprising a first driving mechanism connected to the first background sheet, wherein:
    in a scan mode, the first driving mechanism drives the first reflective surface of the first background sheet to rotate relatively to the first sensing assembly to be not parallel to the scan window; and
    in a calibration mode, the first driving mechanism drives the first background sheet to rotate relatively to the first sensing assembly to be substantially parallel to and the scan window, the first sensing assembly receives the first scan light to obtain a first calibration signal, and a processor of the light sensing apparatus calibrates the first scan signal according to the first calibration signal.

11. A light sensing method applied to the light sensing apparatus according to claim 8, the light sensing method comprising steps of:
    transporting the data medium into the sheet passage;
    generating a mixed signal of the first scan signal and the first background signal according to steps of: (a) enabling the first sensing assembly to sense the second portion of the first scan light before the data medium reaches the scan window; (b) enabling the first sensing assembly to sense the first portion and the second portion of the first scan light when the data medium passes through the scan window; and (c) enabling the first sensing assembly to sense the first portion of the first scan light after the data medium leaves the scan window; and
    separating the first scan signal from the mixed signal according to a property of the first background signal.

12. The light sensing apparatus according to claim 1, further comprising:
    a second sensing assembly, which is disposed on the second side of the scan window, and outputs a second scan light to the scan window; and
    a second background sheet, which is disposed on the first side of the scan window and has a second reflective surface, wherein the second reflective surface reflects the second scan light, passing through the scan window, back to the second sensing assembly through the scan window, and the second reflective surface of the second background sheet and the scan window are disposed in a non-parallel manner.

13. The light sensing apparatus according to claim 12, further comprising a first transparent substrate and a second transparent substrate respectively disposed on two sides of the scan window, and disposed between the first sensing assembly and the first background sheet.

14. The light sensing apparatus according to claim 13, wherein the first transparent substrate and the first reflective surface of the first background sheet are disposed in a non-parallel manner, and the second transparent substrate and the second reflective surface of the second background sheet are disposed in a non-parallel manner.

15. The light sensing apparatus according to claim 12, wherein:
    the first sensing assembly comprises a first light emitting element and multiple first sensing elements, the first light emitting element emits the first scan light to the scan window, and the first sensing elements receive the first scan light reflected by the first background sheet; and the second sensing assembly comprises a second light emitting element and multiple second sensing elements, the second light emitting element emits the second scan light to the scan window, and the second sensing elements receive the second scan light reflected by the second background sheet.

16. The light sensing apparatus according to claim 12, wherein a first angle is formed between the first background sheet and the scan window, a second angle is formed between the second background sheet and the scan window, and the first angle is unequal to the second angle.

17. The light sensing apparatus according to claim 12, wherein when a data medium is transported by a transporting mechanism of the light sensing apparatus past the scan window along the sheet passage, a first portion of the first scan light is reflected, by a first surface of the data medium, back to the first sensing assembly to generate a first scan signal; a second portion of the first scan light is reflected, by the first background sheet, back to the first sensing assembly to generate a first background signal; a first portion of the second scan light is reflected, by a second surface of the data medium, back to the second sensing assembly to generate a second scan signal; and a second portion of the second scan light is reflected, by the second background sheet, back to the second sensing assembly to generate a second background signal.

18. The light sensing apparatus according to claim 17, wherein a processor of the light sensing apparatus seeks one or multiple boundaries of an image representative of the first scan signal according to the first background signal; and the processor seeks one or multiple boundaries of an image representative of the second scan signal according to the second background signal.

19. The light sensing apparatus according to claim 17, wherein a processor of the light sensing apparatus calibrates the first scan signal according to the first background signal, and calibrates the second scan signal according to the second background signal.

20. The light sensing apparatus according to claim 17, further comprising:
a first driving mechanism connected to the first background sheet; and
a second driving mechanism connected to the second background sheet, wherein:
in a scan mode, the first driving mechanism drives the first background sheet to rotate relatively to the first reflective surface of the first sensing assembly to be not parallel to the scan window, and the second driving mechanism drives the second reflective surface of the second background sheet to rotate relatively to the second sensing assembly to be not parallel to the scan window; and
in a calibration mode, the first driving mechanism drives the first background sheet to rotate relatively to the first sensing assembly to be substantially parallel to the scan window, and the first sensing assembly receives the first scan light to obtain a first calibration signal; and the second driving mechanism drives the second background sheet to rotate relatively to the second sensing assembly to be substantially parallel to the scan window, the second sensing assembly receives the second scan light to obtain a second calibration signal, and a processor of the light sensing apparatus calibrates the first scan signal according to the first calibration signal and calibrates the second scan signal according to the second calibration signal.

* * * * *